United States Patent [19]

Sofer

[11] 3,910,818
[45] Oct. 7, 1975

[54] METHOD FOR INCREASING THE BURN-UP CAPABILITY OF BOILING WATER NUCLEAR REACTORS CONTAINING PLUTONIUM-BEARING FUEL ASSEMBLIES

[75] Inventor: George A. Sofer, White Plains, N.Y.

[73] Assignee: General Atomic Company, San Diego, Calif.

[22] Filed: Oct. 30, 1969

[21] Appl. No.: 872,665

[52] U.S. Cl. .................. 176/54; 176/20; 176/30
[51] Int. Cl. .................................. G21c 19/28
[58] Field of Search .................. 176/54–56, 176/19, 20, 30

[56] References Cited
UNITED STATES PATENTS

| 3,022,235 | 2/1962 | Brown et al. ............... 176/55 X |
| 3,061,533 | 10/1962 | Shannon et al. ............... 176/56 |
| 3,226,299 | 12/1965 | Hackney ............... 176/54 X |
| 3,389,056 | 6/1968 | Frisch ............... 176/78 |
| 3,486,973 | 12/1969 | Georges et al. ............... 176/18 |

OTHER PUBLICATIONS

El-Wakil, M. M., *Nuclear Power Engineering*, McGraw Hill, 1962, pp. 276–282, 312–316.
Benedict and Pigford, *Nuclear Chemical Engineering*, 1957, pp. 87, 88.

Primary Examiner—Benjamin R. Padgett
Assistant Examiner—P. A. Nelson
Attorney, Agent, or Firm—Pennie & Edmonds

[57] ABSTRACT

The burn-up capability of a boiling water nuclear reactor containing plutonium-bearing fuel assemblies is significantly increased by reducing the void fraction in the core toward the end of the cycle. This reduction is advantageously accomplished by increasing the rate at which water is recirculated.

2 Claims, 6 Drawing Figures

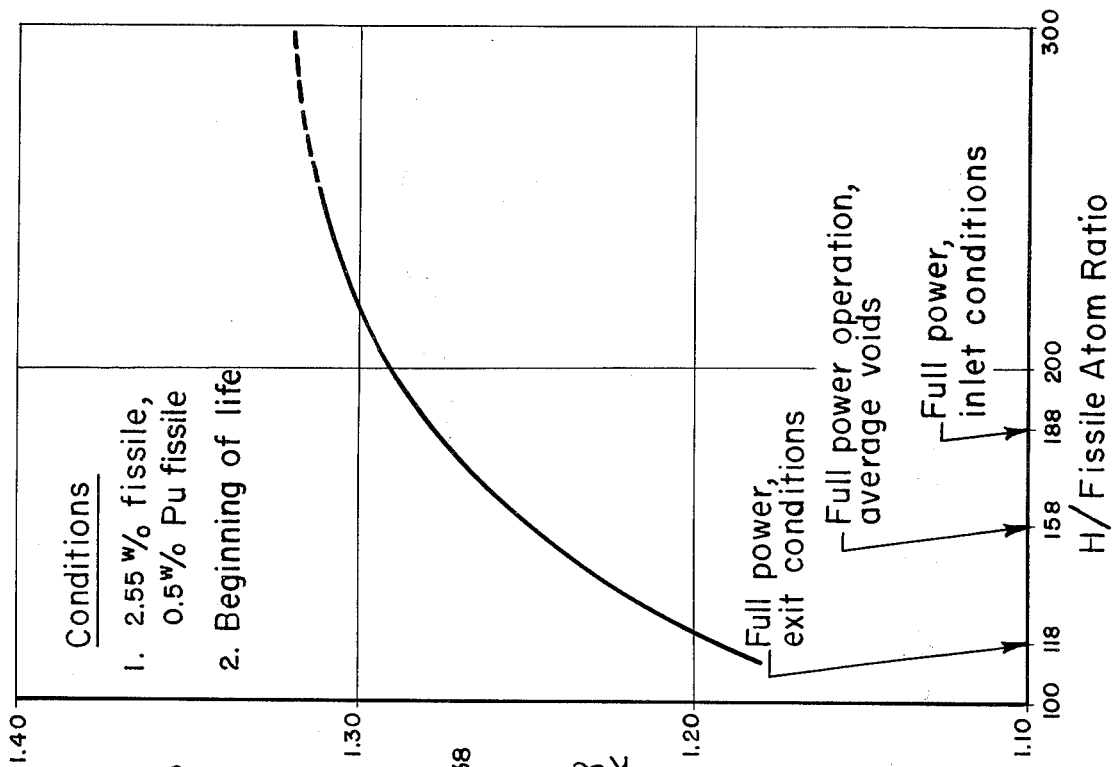
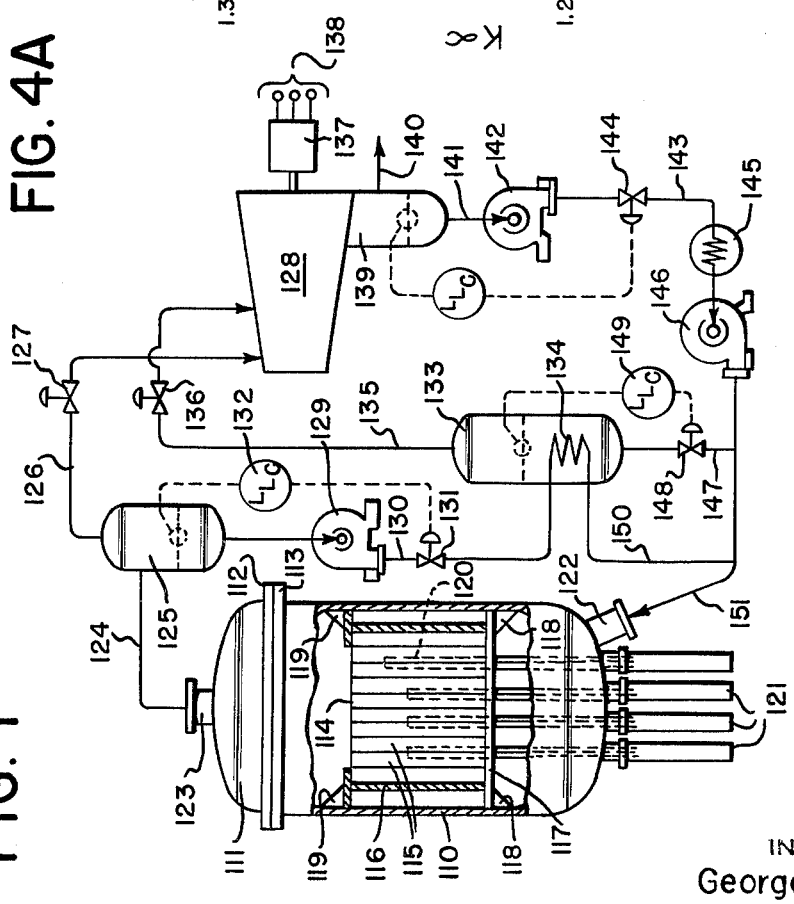
INVENTOR
George A. Sofer
BY
Pennie, Edmonds, Morton,
Taylor & Adams ATTORNEYS

FIG. 3
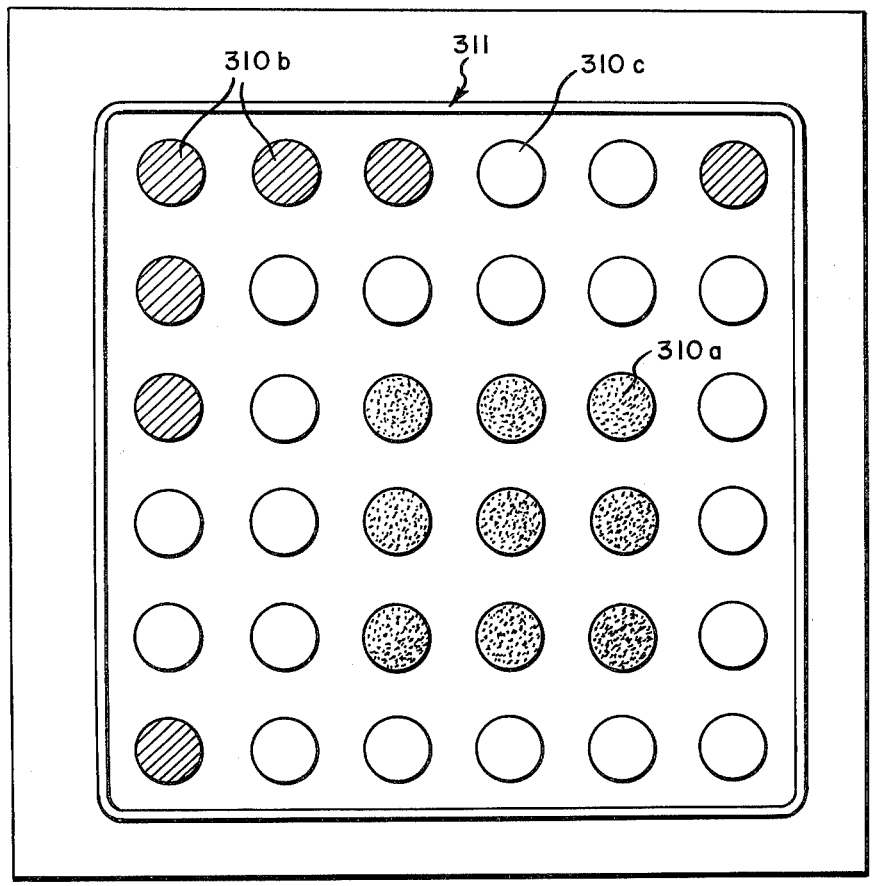
 1.927 w/o U²³⁵ — 1.927 w/o $U^{235}$
 1.99 w/o Pu (fissile) + U (natural)
 2.700 w/o $U^{235}$

METHOD FOR INCREASING THE BURN-UP CAPABILITY OF BOILING WATER NUCLEAR REACTORS CONTAINING PLUTONIUM-BEARING FUEL ASSEMBLIES

BACKGROUND OF THE INVENTION

This invention relates to the control of a boiling water reactor (BWR) fueled by variation of the void fraction in the core.

Nuclear reactors are the principal means for converting the large amounts of energy released by nuclear fission into useful thermal energy. When a fissionable atom such as $U^{233}$, $U^{235}$, $Pu^{239}$ or $Pu^{241}$ absorbs a thermal neutron, there is a high probability that it will undergo nuclear fission, splitting into two fission products of lower atomic weight having great kinetic energy and emitting a number of neutrons. In a nuclear reactor the kinetic energy of the fission products is dissipated as heat in the nuclear fuel elements and removed from the reactor by a coolant in heat exchange relationship with the fuel elements. The fission neutrons are slowed down to the thermal range by a moderator and, in turn, used to induce a subsequent fission in another atom in order to keep the reaction self-sustaining. Excess neutrons can be used to produce additional fissionable material such as $Pu^{239}$ or $Pu^{241}$ from a fertile material such as $U^{238}$.

Boiling water nuclear reactors possess a number of advantages which make them particularly attractive for use in power generation. In these reactors water performs the dual function of cooling the reactor core and moderating fission neutrons. Because the water is permitted to boil, it is possible to utilize its latent heat of evaporation to extract heat from the reactor at high rates and to eliminate the necessity of intervening heat exchanges by feeding steam generated within the reactor directly into a turbine.

Boiling water reactors of many types are described in the literature of the art. (See, for example, A.W. Kramer *Boiling Water Reactors*, Addison-Wesley, 1958.) A typical heterogeneous BWR comprises, in essence, a reactor pressure vessel and a nuclear chain reacting core made up of a number of nuclear fuel element assemblies. Each fuel assembly comprises an open-ended tubular flow channel surrounding a bundle of rod-type nuclear fuel elements — each of which is typically zirconium-clad enriched uranium oxide. Water is circulated through the channels and around the fuel rods both to remove heat and to act as a moderator. The water is circulated slowly so that it leaves the reactor core as a mixture of boiling water and steam. The steam is usually used to drive a turbine and, after it has condensed, the water is recirculated through the reactor. Typically the recirculation rate is only so high as is necessary to maintain the required thermo-hydraulic safety margins.

In a concurrently filed U.S. application entitled "Fuel Assemblies Containing $UO_2$ and $PuO_2$—$UO_2$ For Water Cooled Nuclear Reactors", the present inventor has described plutonium-bearing fuel assemblies which are particularly advantageous for use in recycling plutonium in water cooled nuclear reactors. The plutonium-bearing rods in these assemblies are distributed to avoid excessive power peaking, to maintain reasonable control rod effectiveness and to minimize fabrication cost. In particular, the fuel assembly comprises two types of fuel rods: rods containing uranium oxide for occupying the regions of the assembly subject to a relatively high thermal neutron flux and rods containing a mixture of plutonium oxide and natural uranium oxide disposed in the regions subject to a relatively low neutron flux. In addition, these assemblies are designed to be compatible with uranium oxide fuel assemblies so that both types of assemblies can be used together in water cooled reactors originally designed for uranium oxide fuel.

While the plutonium-bearing fuel assemblies described above can be used in the same manner as uranium oxide fuel assemblies, as the percentage of plutonium assemblies in the reactor core increases it becomes increasingly desirable to modify the reactor and its operating characteristics, to take advantage of the particular characteristics of the plutonium. The present inventor has discovered an especially simple and economical way of exploiting the particular characteristics of these plutonium-bearing fuel assemblies in boiling water nuclear reactors.

SUMMARY OF THE INVENTION

In accordance with the invention, the burn-up capability of a boiling water reactor containing plutonium-bearing fuel assemblies is significantly increased by reducing the void fraction in the core toward the end of the fuel cycle. This can advantageously be accomplished in typical reactors by providing additional recirculation flow pumping capability for increasing the flow rate near the end of the cycle. The steam generation rate and the feedwater temperature are preferably kept constant.

BRIEF DESCRIPTION OF THE DRAWINGS

The advantages, nature and various additional features of the present invention will appear more fully upon consideration of the illustrative embodiments now to be described in detail in connection with the accompanying drawings.

In the drawings:

FIG. 1 is an elevation view in partial cross section of a typical BWR power plant;

FIG. 3 is a transverse cross section of a typical plutonium-bearing fuel assembly for use in a boiling water reactor controlled in accordance with the invention; and FIGS. 4A, 4B and 4C are graphical illustrations, useful in understanding the invention, showing the multiplication factor, the conversion ratio, and the capture-to-fission ratio, respectively, as functions of the hydrogen atom-to-fissile atom ratio.

Figure 2:
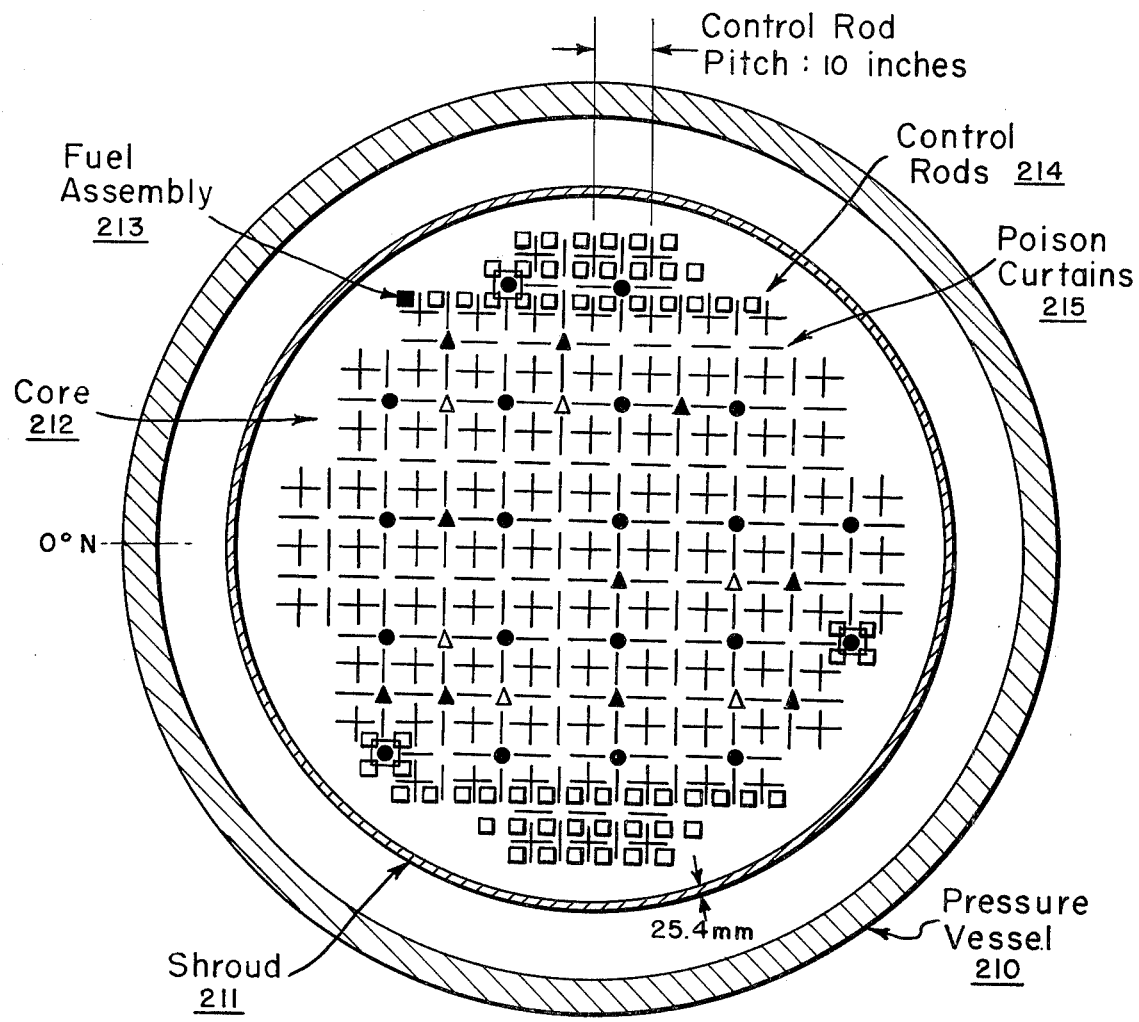
FIG. 2 is a transverse cross section of a typical BWR which can be controlled in accordance with the invention.

A brief description of the system illustrated in FIG. 1 will be useful in conveying a full understanding of the invention.

The system includes a reactor pressure vessel 110 provided with removable head 111 secured by means of flanges 112 and 113. In a typical case, this vessel is 25–50 feet inside height, 10–20 feet inside diameter, has a wall thickness of several inches, and is lined with stainless steel. Disposed within vessel 110 is a nuclear chain reacting core 114 made up of plurality of nuclear fuel element assemblies. Each assembly consists of an open-ended flow channel or conduit 115 surrounding an assembly of rod type nuclear fuel elements. A neutron moderating coolant fluid flows upwardly through each channel and around the fuel elements therein. A typical core consists of a few hundred fuel assemblies arranged in a group approximating a righ circular cylinder.

The core also includes control poison elements 120 which are reciprocable by means of an equal number of control element drive mechanisms 121, and by means of which the thermal energy release rate or power level of the core is controlled. The control elements 120 are withdrawn from the core to increase reactivity and raise the power level of the core and are inserted to decrease reactivity and to lower the power level. Only four control elements 120 and control drive mechanisms 121 are shown for simplicity of illustration. Although the control rod drives are shown mounted below the pressure vessel 110 and extend upwardly into the core, top mounted drives on vessel head 111 extending downward into the core may be substituted.

Reactor core 114 is immediately surrounded by a thermal shield 116. The thermal shield 116 and the core 114 are all supported upon a lower core support structure or grid 117 which in turn is supported by means of support elements 118 from the internal surfaces of vessel 110. Upper support means 119 are provided which secure the upper portion of the thermal shield structure within the vessel, and give lateral support to the core 114.

Demineralized light water constitutes the reactor coolant and the neutron moderator employed in this nuclear reactor. It is introduced into the bottom of vessel 110 by means of inlet 122 at a temperature of about 500°F., at the operating pressure of approximately 1000 p.s.i.a. The water flows upwardly through lower support structure 117 and through all of the flow channels 115 in direct heat exchange relationship with the fuel element assemblies contained in the channels. The water is heated to the boiling temperature and partially vaporized. A mixture of boiling water and steam is discharged into the region above core 114 and flows from reactor vessel 110 through outlet 123. This mixture is passed by means of line 124 into separator drum 125. Here the boiling water is separated from the steam, the steam being introduced through line 126 at a rate controlled by valve 127 into the high pressure inlet of dual admission steam turbine 128. The unvaporized water separated in steam drum 125 is pumped by means of pump 129 through line 130 at a rate controlled by valve 131 and liquid level controller 132 into secondary steam generator 133. This water, at its boiling temperature of about 550°F., is passed through heat exchange coil 134 where it is cooled. Additional steam is produced on the outside of coil 134 at pressures ranging between about 500 and 1000 p.s.i.a. depending upon system load. This additional or secondary steam is introduced by means of line 135 at a rate controlled by valve 136 into the secondary steam admission port of turbine 128. The turbine drives an electrical generator 137 to a gross electrical output of a few hundred electrical megawatts. The generator is connected through the usual transformer to a transmission line, or to any other load, by means of output terminals 138.

Exhaust steam from turbine 128 is condensed in condenser 139 from which non-condensible gases are removed through line 140 by means of an exhaust system not shown. The condensate is removed through line 141 by means of condensate pump 142. The condensate is passed through line 143 at a rate controlled by valve 144 and becomes feedwater in the power plant system. The feedwater, which may be preheated in exchanger 145 by means of extraction steam from the turbine or other source of heat, is pumped back to the evaporation facilities by means of feedwater pump 146.

One portion of the feedwater, termed secondary feedwater, is passed through line 147 at a rate controlled by valve 148 and liquid level controller 149 into the secondary steam generator 133 for re-evaporation. The remaining feedwater portion is combined with the subcooled water discharged from the secondary steam generator coil 134 through line 150, the mixture being introduced as primary feedwater through line 151 and primary feedwater inlets 122 into the reactor vessel 110.

FIG. 2 is a schematic transverse cross section of a boiling water nuclear reactor typical of the reactors which can be controlled in accordance with the invention. The reactor comprises, in essence, a pressure vessel 210, a shroud 211 and a core 212. The core comprises a plurality of fuel assemblies 213 typically disposed in clusters around cruciform shaped control rods 214. Poison curtains 215 are initially disposed around the periphery of the cluster.

A specific example of a reactor having this structure is the KRB Gundremmingen power station boiling water nuclear reactor described in detail in the literature of the art. This reactor has a core for containing 368 fuel assemblies, 89 control rods and 156 poison curtains. Each fuel assembly contains a 6×6 array of fuel rods disposed within a 4.47 inch square conduit, preferably a zirconium alloy having a wall thickness of about 0.060 inch. The fuel is contained in zirconium alloy (Zircaloy-2) tubes, each having an outside diameter of 0.563 inch, a wall thickness of 0.035 inch and an active length of 130 inches. The reactor was designed to utilize $UO_2$ fuel having an average fissile content of 2.5 per cent by weight. The fuel is disposed in the rods as sintered pellets at 94 per cent of theoretical density.

The control rods are stainless steel tubes (0.025 inch wall thickness) containing $B_4C$. They have a span of 7.1 inches, a thickness of 0.276 inch and are placed on a 10 inch square pitch. The poison curtains are full length stainless steel (130 inches ×6 inches ×0.063 inches) plates axially zoned with 3700, 5700 and 3700 parts per million of natural boron, respectively.

In operation, the control rods are partially or totally withdrawn, leaving the fuel assemblies in a critical mass relationship. The core is designed to produce 237 Mw(e) (net), 801 Mw(t). It is operated at a pressure of 1015 pounds per square inch and with a coolant inlet temperature of 510°F. At full power with a uranium oxide core the average coolant void fraction (i.e. percentage of steam and vapor to liquid) within the fuel assemblies is 28.9 per cent by volume.

FIG. 3 is a transverse cross section of a typical plutonium-bearing fuel assembly for use in a boiling water reactor controlled in accordance with the invention. The assembly is specifically designed for recycling plutonium in the KRB reactor. The assembly comprises a 6×6 array of rod type fuel elements 310 a, b and c disposed in a conduit 311. Various ones of these rods contain nuclear fuel having one of three different compositions: plutonium-enriched uranium oxide, $U^{235}$ enriched uranium oxide having a low enrichment and $U^{235}$ enriched uranium oxide having a high enrichment.

Nine of the rods in an assembly are fueled with plutonium oxide-uranium oxide and these are placed in a 3×3 array near the center of the assembly where they are subject to a relatively low flux of thermal neutrons. Advantageously, these rods 310 a are fabricated from plutonium having the isotopic composition produced in a previously discharged uranium oxide fuel assembly. In this particular example, the amount of fissionable plutonium in the assembly (0.51 per cent by weight) corresponds to the plutonium content of a uranium oxide fuel assembly discharged from the KRB reactor after a 22,000 Mwd/MTU exposure. The isotopic composition resulting from such an exposure is: $Pu^{239}$-63 atom per cent, $Pu^{240}$-21 per cent, $Pu^{241}$-12 per cent and $Pu^{242}$-4 per cent.

The uranium oxide fuel rods occupy the remaining positions in the assembly. Rods 310 b bearing uranium oxide of low enrichment (1.927 per cent $U^{235}$ by weight) are disposed in the regions of greatest thermal neutron flux near the wide water gaps produced by the withdrawal of the reactor control rods and in the corner positions. The more highly enriched uranium oxide rods 310 c (containing 2.7 per cent $U^{235}$ by weight) are positioned in the remaining sites of the assembly surrounding the plutonium fueled rods near the center of the assembly of intermediate flux.

Figure 4C:
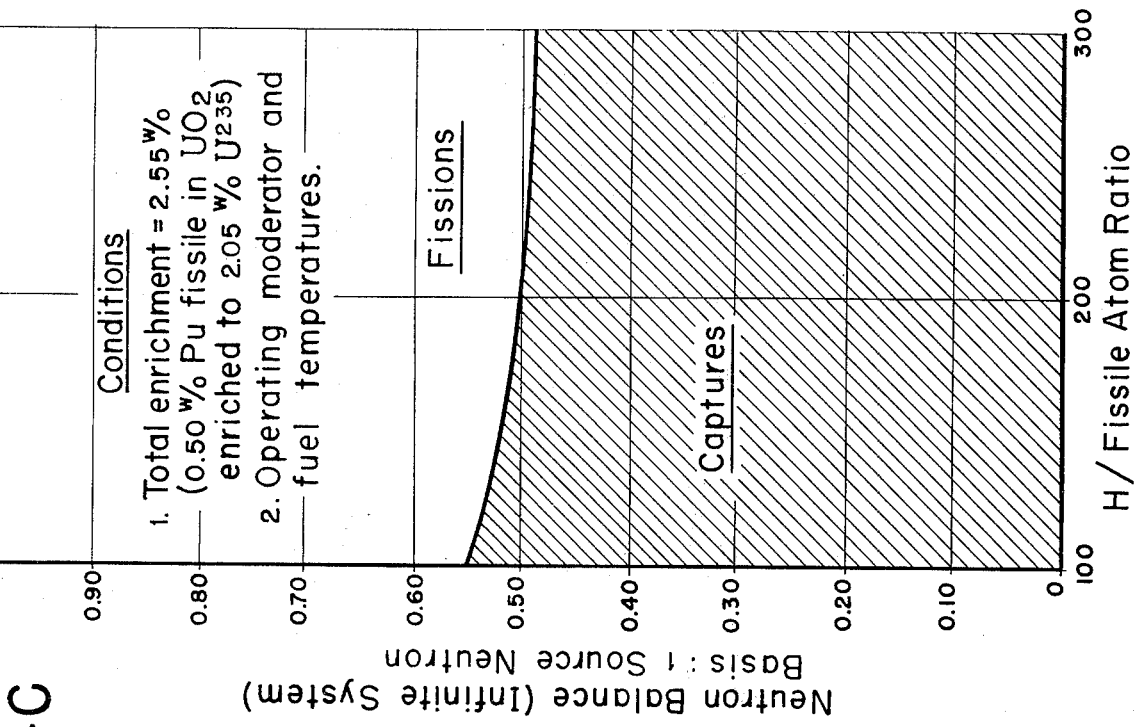
Figure 4B:
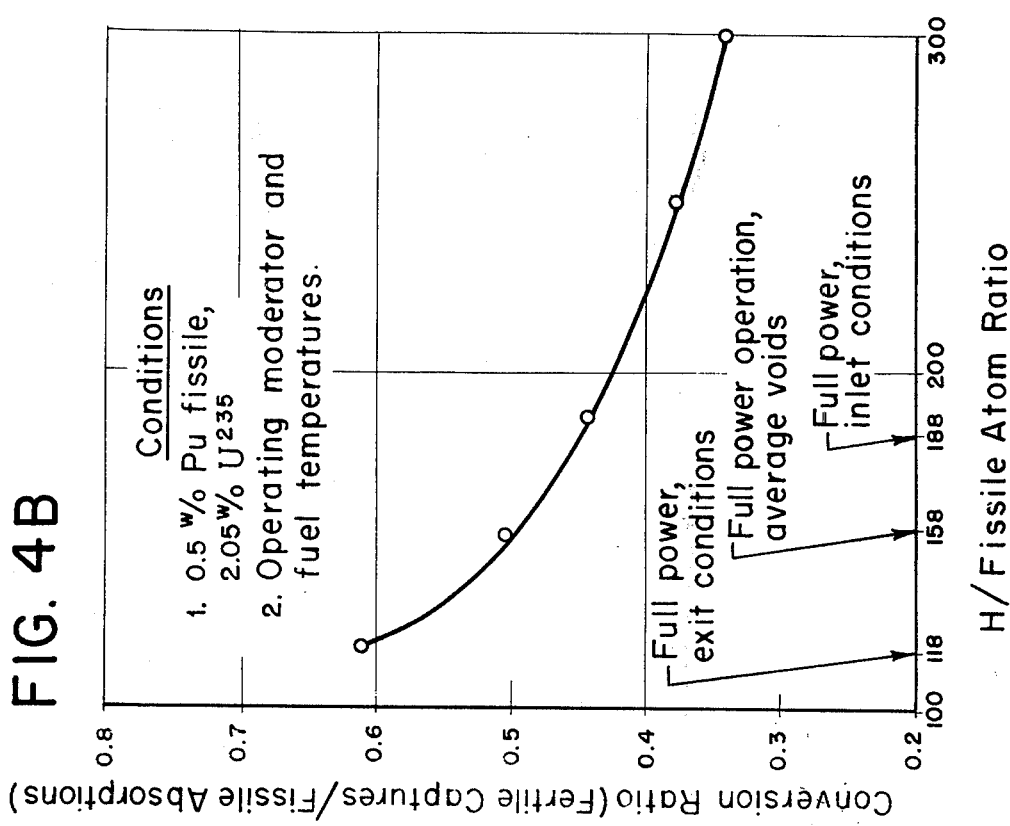

While this assembly is designed to be compatible with uranium oxide assemblies, as the percentage of plutonium assemblies in the reactor core increases it becomes increasingly desirable to take advantage of the particular nuclear characteristics of the plutonium-bearing fuel assemblies. More specifically, it has been determined that a modest softening of neutron spectrum in a core containing such assemblies produces a much greater increase in reactivity than would be produced in $UO_2$ fueled cores. This increase in reactivity is due to the fact that these fuel assemblies in a softened spectrum have an increased fission cross section, reduced parsitic absorption and reduced capture-to-fission ratio. These effects can be seen by reference to FIGS. 4A, 4B and 4C which are graphical illustrations showing the infinite multiplication factor, conversion ratio, and capture-to-fission ratio, respectively, as functions of the hydrogen atom-to-fissile atom ratio. The curves shown are for the fuel assembly described in connection with FIG. 3 in the KRB reactor. Thus it is clear that the burn-up capability of a $PuO_2$—$UO_2$ fueled core can be significantly increased by reducing the void fraction in the core toward the end of the cycle.

Due to these effects, it becomes advantageous to deviate from the usual practice of using—throughout the fuel cycle—the lowest water recirculating rate adequate to maintain required thermo-hydraulic margins. In particular, when the amount of plutonium in the reactor core exceeds about 20 per cent of the amount produced in a typical uranium oxide cycle, it becomes advantageous to exceed this minimum recirculating rate by between 10 and 30 per cent toward the end of the cycle. The preferred excess pumping capacity is on the order of 20 per cent.

The preferred method of controlling $PuO_2$—$UO_2$ fueled boiling water reactors in accordance with the invention involves starting the reactor with the minimum recirculating rate required to maintain the required margins. Then, after it has become necessary to withdraw all control rods to maintain the desired output and the power level begins to drop, the water recirculation rate is increased between 10 and 30 per cent. The result is a lower void fraction for a given fixed rate of power production and an increased energy output from the reactor due to the effect of the lower hydrogen-to-fissile atom ratio on the plutonium-bearing assemblies. An increased exposure of 1000–3000 Mwd/MTU (depending on the plutonium content of the core) can be obtained from a reactor similar to the KRB reactor through the use of this method.

It is understood that the method described hereinabove is merely illustrative of the many possible specific embodiments of the invention. For example, while the method is described in connection with the use of specific fuel assemblies in a dual cycle reactor, it is equally applicable to boiling water nuclear reactors utilizing a wide variety of fuel assemblies containing $UO_2$ and $PuO_2$ in varying proportions. In addition, other types of boiling water nuclear reactors such as for example a single cycle reactor can be used in the manner of the invention. Thus, numerous and varied other arrangements can be readily devised by those skilled in the art without departing from the spirit and scope of the invention.

I claim:

1. A method for utilizing plutonium enriched nuclear fuel in a boiling water nuclear reactor having a core consisting predominantly of uranium enriched fuel assemblies and adapted to recirculate water through said core at a predetermined flow rate comprising the steps of:

disposing in said core one or more fuel assemblies containing sufficient plutonium enriched fuel that the amount of plutonium enrichment disposed in said core exceeds by at least 20 per cent the amount of plutonium produced by the reactor during a normal uranium oxide fuel cycle;

beginning a fuel cycle by initiating reactor operation;

operating said reactor during a first portion of the fuel cycle with the void fraction of said boiling water reactor maintained substantially at a predetermined level;

reducing said void fraction by increasing the recirculation flow rate by between 10 and 30 per cent; and operating said reactor during the end portion of said fuel cycle with said void fraction substantially maintained below said predetermined level by maintaining an increased recirculation rate until substantially the end of said fuel cycle.

2. The method according to claim 1 wherein said recirculation flow rate is increased by about 20 per cent.

* * * * *